June 23, 1959 C. W. CHASE 2,891,791

JAW FOLDING MECHANISM

Filed Dec. 19, 1955 7 Sheets-Sheet 1

Inventor:
Corson Walter Chase
By: Carlson, Pitzner, Hubbard & Wolfe
Attys

INVENTOR.
Corson Walter Chase
BY
Carlson, Pitzner, Hubbard & Wolfe
Attys.

INVENTOR.
Corson Walter Chase
BY
Carlson, Pitzner, Hubbard & Wolfe
Attys.

INVENTOR.
Corson Walter Chase
BY
Carlson, Pitzner, Hubbard & Wolfe
Attys.

JAW FOLDING MECHANISM

Filed Dec. 19, 1955 7 Sheets-Sheet 5

INVENTOR.
Corson Walter Chase
BY
Carlson, Pitzner, Hubbard & Wolfe
Attys.

June 23, 1959 C. W. CHASE 2,891,791

JAW FOLDING MECHANISM

Filed Dec. 19, 1955 7 Sheets-Sheet 6

INVENTOR.
Corson Walter Chase
BY
Carlson, Pitzner, Hubbard & Wolfe
Attys.

INVENTOR.
Corson Walter Chase
BY
Carlson, Pitzner, Hubbard & Wolfe
Attys.

United States Patent Office 2,891,791

Patented June 23, 1959

2,891,791

JAW FOLDING MECHANISM

Corson Walter Chase, Oak Park, Ill., assignor to Miehle-Goss-Dexter, Incorporated, Wilmington, Del., a corporation of Delaware Application December 19, 1955, Serial No. 553,987

18 Claims. (Cl. 270—71)

This invention relates in general to printing presses or other like apparatus, and in particular to jaw-type folding mechanisms for creasing flexible products, such as book signatures, coming from a printing press. As used herein, the term "product" denotes any flexible element, of single or plural sheets which is to be folded, whether made of paper or other material and whether printed or unprinted.

The general aim of the invention is to make possible reliable and high speed folding of products with assurance that they will not become crumpled and jammed.

Further to that aim, it is an object of the invention to provide an improved jaw folding mechanism in which a tucking element folds products into a slot where they are crimped by jaws and which is particularly characterized in that the folded products, even the inner sheets of multiple leaf gloss paper signatures, cannot be withdrawn as the tucking element is retracted from the slot.

A more specific object of the invention is to provide a jaw folding mechanism having separate means independent of the usual jaws and divorced from the tucker blade for holding products in a folding slot, and having means for opening the jaws while the tucker blade is withdrawn, thereby positively precluding the blade from pulling out all or part of a folded product.

Still another object of the invention is to provide such an improved jaw folding mechanism which is simple and inexpensive in construction, yet fast and reliable in operation and readily employed in a variety of printing press installations.

Other objects and advantages will become apparent as the following description proceeds, taken in conjunction with the accompanying drawings, in which:

Figure 1 is a vertical section of the delivery mechanism of a printing press, illustrating one environment in which the jaw folding mechanism of the present invention finds advantageous use;

Figs. 2 and 3 are fragmentary cross sections of the jaw cylinder, taken generally along the lines 2—2 and 3—3, respectively in Fig. 4;

Fig. 2*a* is a detail view, in section, taken along the line **2*a*—2*a*** in Fig. 2;

Figures 2, 2A, 3:
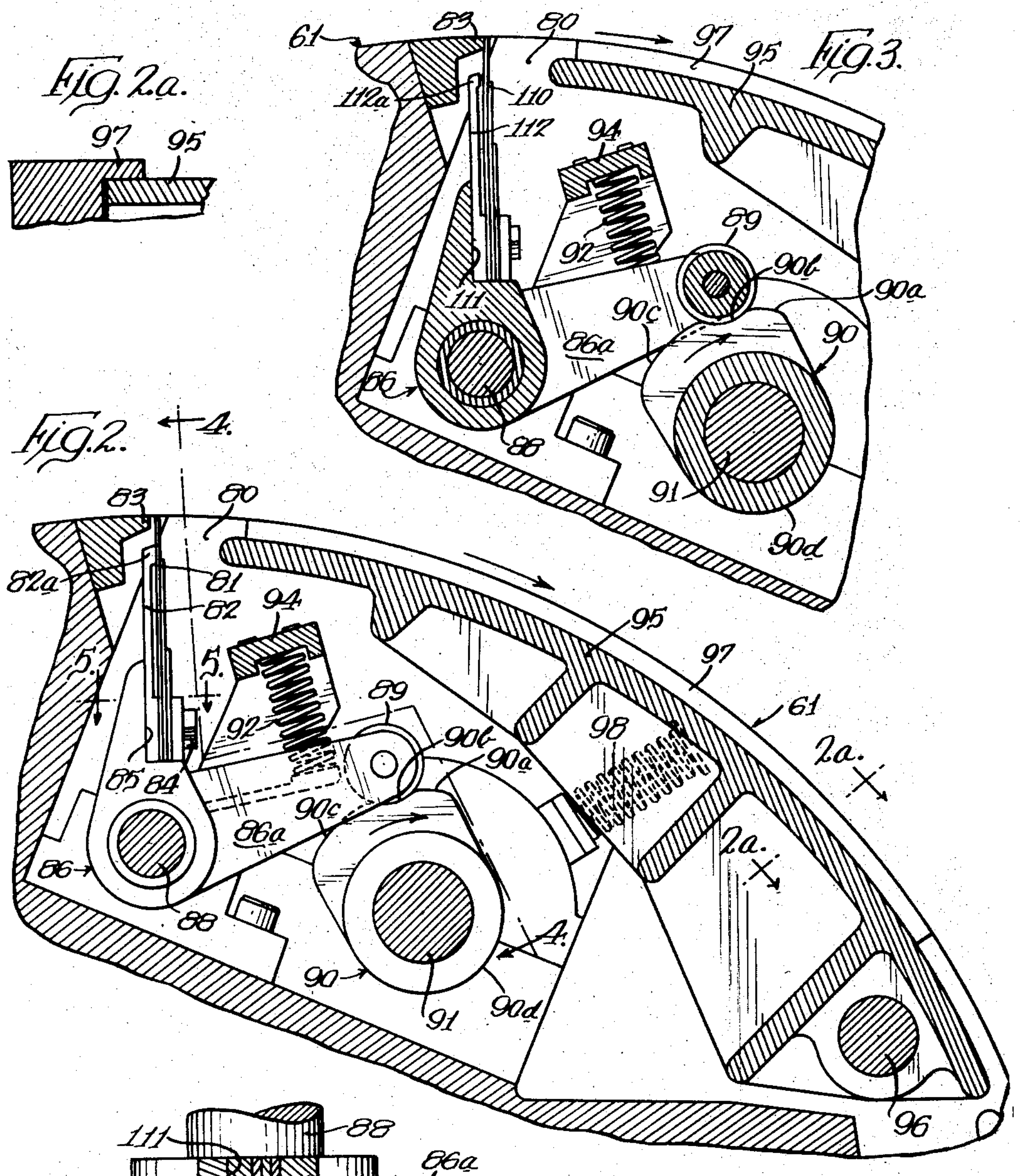
Figure 13:
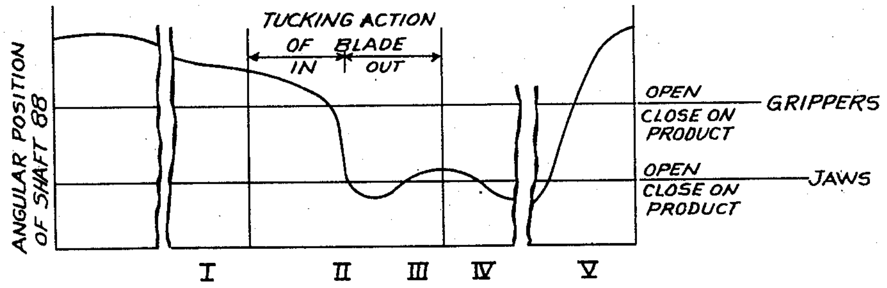
Figure 14:
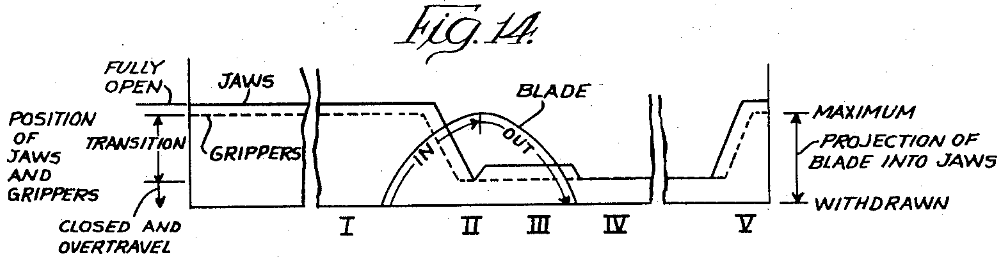
Figure 15:
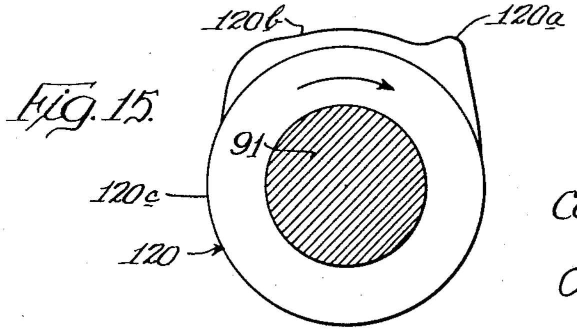
Figure 16:
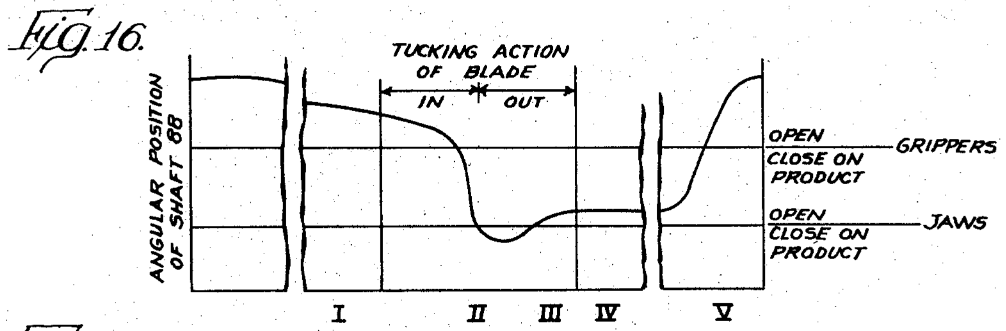
Figure 17:
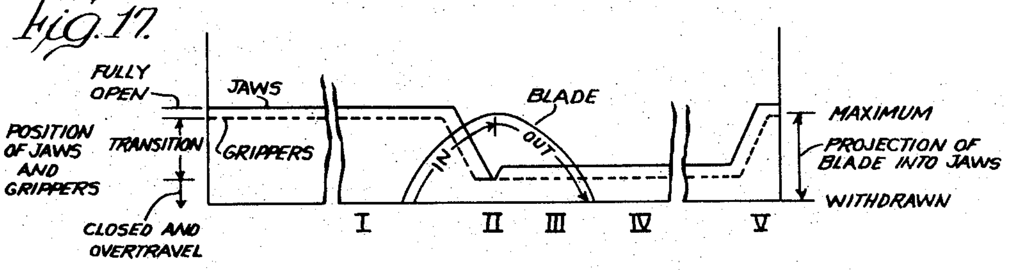
Figure 19:
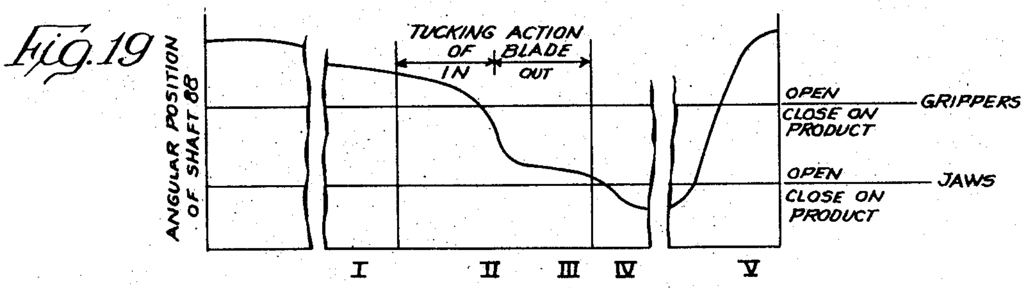
Figure 20:
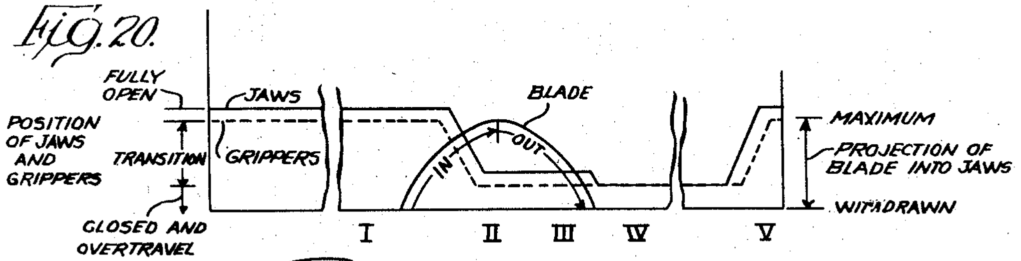
Figure 18:
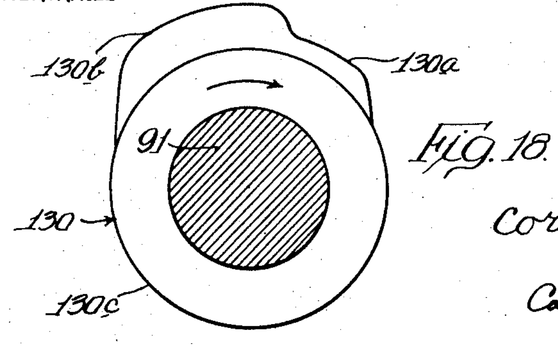

Figs. 8, 8*a* through 12, 12*a* are fragmentary sectional views illustrating the sequential positions of jaws and grippers at several instants during one operating cycle;

Fig. 13 is a graph showing the angular positions of jaw and gripper mounting shafts as produced by the cam in Fig. 3 over one operating cycle;

Fig. 14 is a diagrammatic illustration, corresponding to Fig. 13, of the tucker blade, jaw and gripper positions over the course of one operating cycle;

Fig. 15 illustrates a modified cam for producing a different sequence of jaw and gripper operation;

Figs. 16 and 17 are similar to Figs. 13 and 14, respectively, except that they show the sequential operation produced by the cam in Fig. 15;

Fig. 18 shows a third form of cam producing a third sequence of jaw and gripper operation; and Figs. 19 and 20 are similar to Figs. 13 and 14, showing the sequential action produced by the cam in Fig. 18.

Although the invention has been shown and is described in some detail with reference to the particular embodiments thereof, there is no intention that it thus be limited to such detail. On the contrary, it is intended here to cover all modifications, alterations and equivalents falling within the spirit and scope of the invention as defined by the appended claims.

Figure 1:
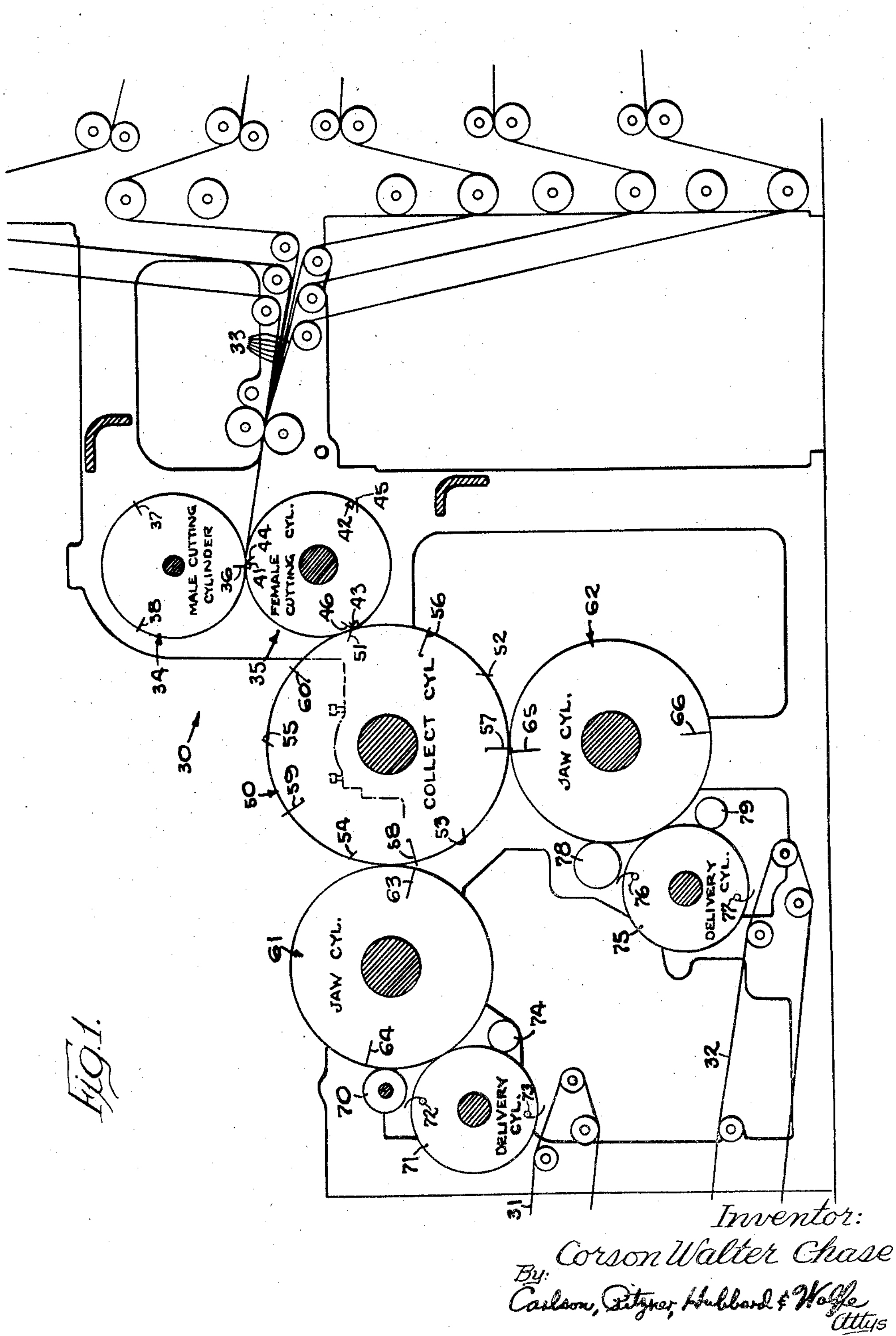

While the invention may be employed with various types of apparatus where products are to be folded, an exemplary printing press delivery mechanism 30 has been shown in Fig. 1 utilizing the improved jaw folding mechanism of the present invention. The delivery mechanism is adapted to cut, fold and deliver signatures or products to two delivery belts 31, 32. At the right or the input end of the delivery mechanism are a set of six webs 33 which are associated with one another and fed between male and female cutting cylinders 34 and 35. Mounted on the cutting cylinder 34 are male knives 36—38 which register with cutting bars 41—43 on the female cylinder. As the multiple leaf products are severed, they are picked up by sets of pins 44—46, respectively, on the latter cylinder.

From the cutting cylinders, the severed products are passed to a collecting cylinder 50 having sets of pins 51—55 with peripherally interspaced tucker blades 56—60. The collecting cylinder picks up the severed products and carries them around for transfer to either of two jaws cylinders 61, 62 having jaw sets 63, 64 and 65, 66, respectively, into which the products are tucked. Associated with the jaw cylinder 61, is a timed feed pulley 70 which advances the folded product from the jaws to a delivery cylinder 71 having grippers 72, 73. A slitter 74 divides the products prior to deposit on the delivery belt 31. Similarly, the products from the jaw cylinder 62 are transferred to a delivery cylinder 75 having grippers 76, 77, timed feeding being effected by a feed pulley 78. A slitter 79 divides the products before they are deposited upon the belt 32.

It will be understood that means are provided for driving all of the cylinders at "press speed," except that the delivery cylinders 71, 75 have a peripheral speed which is approximately 35 percent less than press speed in order to decelerate the products prior to depositing them on the delivery belts.

Inasmuch as the jaw cylinders 61 and 62 are alike and the several jaw sets 63—66 similar, the jaw set 63 of the cylinder 61 will be described as representative. As best seen in Figs. 2–5, the cylinder 61 is formed with an axial slot 80 in which a plurality of movable jaws 81 are disposed. The jaws 81 preferably comprise a series of leaf springs mounted on a backing plate 82 which is movable to swing the jaw tips between closed and open positions relative to a projecting abutment 83. For imparting this movement to the jaws, the backing plates are held by bolts 84 in recesses or seats 85 formed in one leg of V-shaped rockers 86 journaled on a stationary shaft 88 running axially of the cylinder 61. Upon reference to Fig.

4, it will be seen that a plurality of the rockers 86 are spaced axially along the shaft 88 and serve to mount a plurality of the spring jaws 81.

A controlled oscillating motion is given to the rockers 86 by means of cam following rollers 89 disposed at the extremities of their other legs 86*a* and bearing against respective ones of a series of cams 90 which are fast on a rotatable cam shaft 91. The followers 89 are urged into contact with the cams 90 by means of a corresponding plurality of compression springs 92 held between a spring supporting bar 94 and seats in the respective rocker arms 86*a*. Upon rotation of the cam shaft 91, therefore, the several cams 90 cause the respective rockers 86 to pivot about the shaft 88, thereby opening and closing the spring jaws 81 with respect to the abutment 83. It will be observed that the spring jaws normally bear against a thickened tip 82*a* on the upper ends of the backing plates 82, which induces a pre-load in the springs. As the jaws 81 close against the abutment 83, the thickened tips 82*a* are deflected away from the spring jaws 81 so that resilient pressure is applied against the abutment 83, or any product disposed between the abutment and jaw tips.

The axial slot 80 is partially enclosed by an arcuate cover plate 95 which is pivoted on an axially disposed shaft 96 to have limited rocking movement. The cover plate is restrained against centrifugal forces by arcuate retainers 97 located at the respective ends of the jaw cylinder 61 which overlie the lateral edges of the plate 95 (Fig. 2*a*). The latter is urged outwardly against the retainers by suitable compression springs 98 (Fig. 2). In the event that products should become jammed in the slot 80, the cover plate 95 is deflected inwardly against the force of the springs 98 to prevent serious damage to the various parts, as disclosed and claimed in copending Hilgoe application, Serial No. 387,009, filed October 19, 1953 and assigned to the assignee of the present invention.

Figures 6, 7:
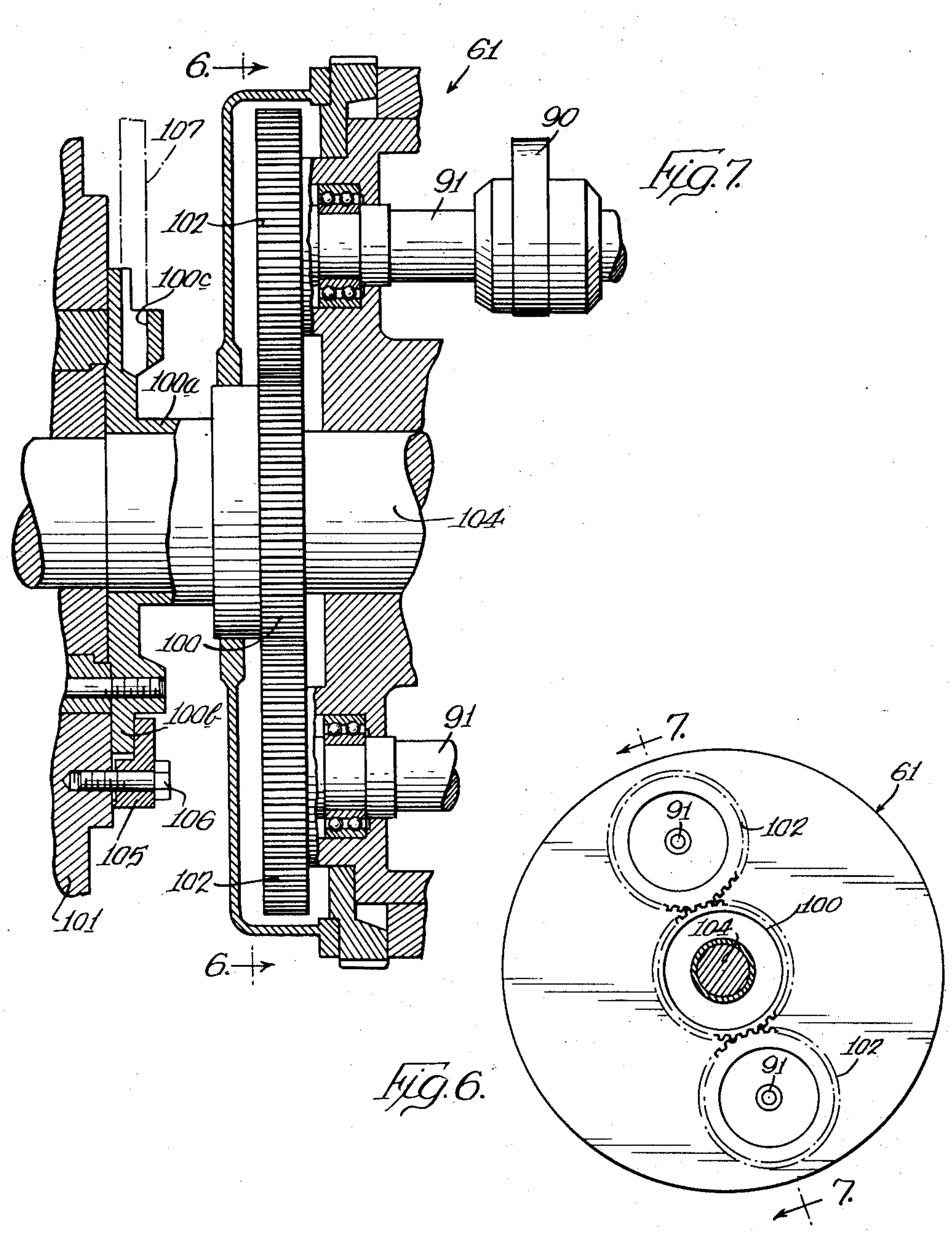
Fig. 6 is an end view, taken along the line 6—6 in Fig. 7, of the jaw cylinder and showing the sun and planet gear arrangement for driving the shafts of jaw and gripper actuating cams.
Fig. 7 is a fragmentary section taken along the line 7—7 in Fig. 6.

For the purpose of rotating the cam shaft 91 and the several cams 90 in timed relation to the cylinder 61, a planetary gear set is provided as illustrated best in Figs. 6 and 7. Briefly, this comprises a stationary sun gear 100 which is held fast to the frame 101 of the delivery mechanism and which is in mesh with a pair of diametrically opposite planet gears 102 fixed on the ends of the cam shafts 91 for the respective jaw sets 63, 64. The sun gear and planet gears preferably have the same diameter so that the cam shafts 91 are turned through one revolution for each revolution of the jaw cylinder 61. The cam shafts and the jaw cylinders thus rotate at the same speed and in the same direction.

For the purpose of affording "phasing" adjustments of the cam shafts, the sun gear 100 is fashioned in the form of a ring having a collar 100*a* terminated with a flange 100*b*. The sun gear 100, as shown in Fig. 6, is rotatably disposed on the mounting shaft 104 for the cylinder 61 and is held fast to the frame 101 by a series of clamps 105. Merely by loosening the clamp bolts 106 and inserting a rod 107 into a capstan recess 100*c* formed in the flange 100*b*, the sun gear may be angularly adjusted relative to the frame to vary the phasing of the cam shafts 91 and cams 90 in order that the jaws 81 operate in proper synchronism with the collecting cylinder 50 and the tucker blades thereon.

Referring again to Figs. 1, 2 and 4, it will be seen that with the collecting cylinder 50 and the jaw cylinder 61 driven in synchronism, one of the tucker blades 56—60 enters the slot 80 once during each revolution of the two cylinders. In prior folding mechanisms of this general type, the cams caused oscillatory movement of the rockers such that the jaws were open as the tucker blade 58 entered the slot 80 and thus tucked a product into the slot. After such tucking, the cams caused the jaws to close and firmly clamp upon the product, crimping it around the tucker blade. The jaws remained closed as the blade was withdrawn upon further rotation of the cylinders, and were subsequently opened by the cams in order to release the folded products to the delivery cylinders 71.

The jaw cylinder and jaw arrangement as thus far described and operating as noted above would work reasonably well under normal conditions, that is, as long as there were no irregularities in the folded products and as long as the products were symmetrically tucked into the jaw slot 80. However, there is always the possibility that where the jaws are closed on the product to clamp it firmly around the tucker blade, the whole product, or at least the inner sheets of a multiple leaf signature, will be withdrawn or misalined when the blade retreats from the slot. This difficulty is particularly acute where glossy paper signatures are being handled since there is relatively little friction between adjacent sheets, but greater friction between the inner sheet and the tucker blade under the compressive force of the spring jaws.

Withdrawal of the product with the tucker blade may foul the whole delivery mechanism and necessitate the entire press being halted for the removal of jammed products. This is particularly true where the jaw cylinder has a conventional solid surface rather than the yielding plates 95, and when operating at high speeds, considerable damage may be caused before even an alert operator is able to stop the press.

In accordance with the invention, this difficulty is obviated by providing means divorced from the active tucker blade to clamp and hold the products while the blade is withdrawn from the jaws. Additionally, the mechanism is constructed such that the jaws 81 are open during the time that the blade is being withdrawn. With the product thus independently held and the jaws open so that the product is not clamped around the tucker blade, the latter slips freely out of the folded product and leaves it intact for subsequent transfer to the delivery cylinder 71.

Figure 4:
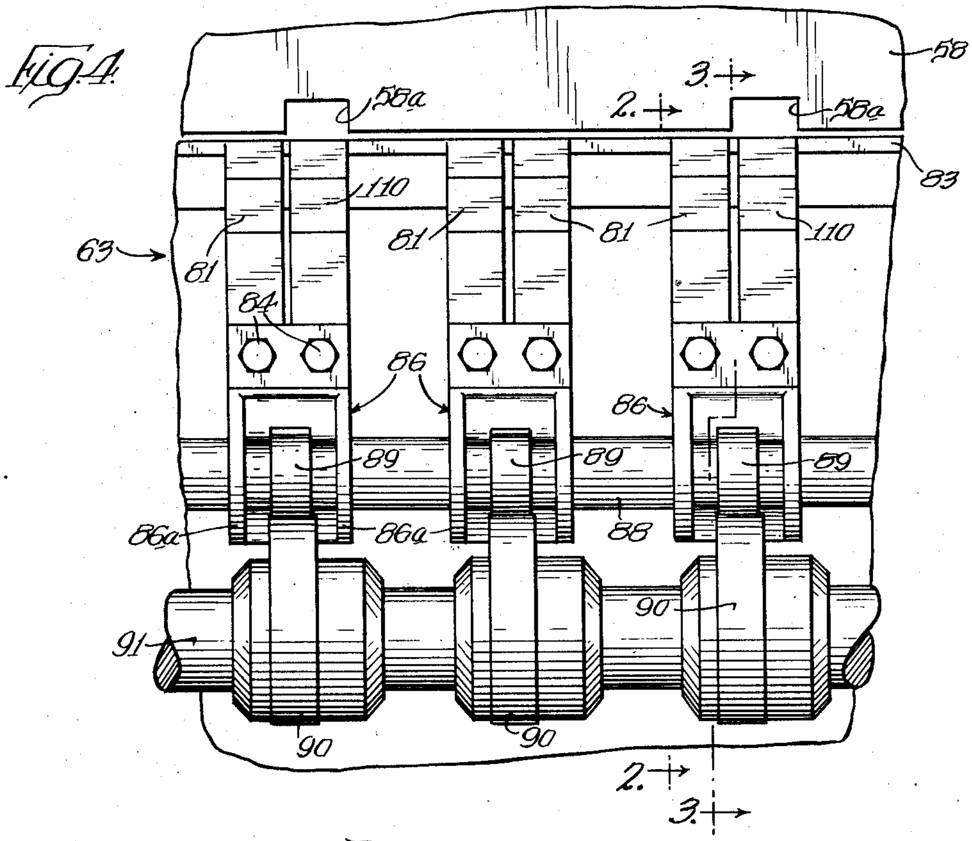
Fig. 4 is a top view of a part of a jaw cylinder employed in the apparatus shown in Fig. 1 and embodying the features of the invention, the view being taken substantially along the offset line 4—4 in Fig. 2.

In the illustrated embodiment, such an arrangement is created by forming the tucker blades 56—60 with a series of spaced notches 58*a* as shown in the blade 58 and by providing a plurality of special grippers 110 which register with the notches 58*a* of the blade when the latter is fully inserted into the slot (Figs. 3 and 4). The grippers 110 are somewhat similar to the jaws 81, being movable between open and closed positions, although when closed they serve to clamp the product directly between their tips and the abutment 83, rather than around the tucker blade 58 as in the case of the jaws 81. The grippers are oscillated between open and closed positions in a different phase than that of the jaws so that the grippers are closed to hold the product against the abutment 83 and the jaws are open to release the clamping force against the blade 58 during the time that the latter is being withdrawn from the slot 80.

Figure 5:
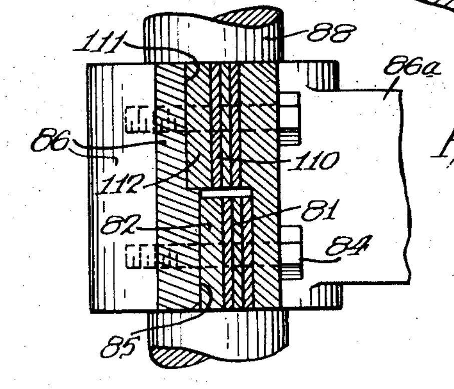
Fig. 5 is a fragmentary detail view taken in section along the line 5—5 in Fig. 2 and illustrating the mounting of a jaw and a gripper.

In the preferred form, the grippers 110 are mounted on the same rockers 86 which support various ones of the jaws 81 (Fig. 4), and are adapted to be actuated by the same cams 90. Different phasing of the jaws 81 and grippers 110 is obtained by machining gripper seats 111 in the rockers 86 slightly deeper than the seats 85 for the jaws 81 (Fig. 5). Additionally, the tips 112*a* of the gripper backing plates 112 are made thinner than the tips 82*a*, the net result being that the outer ends of the spring leaf grippers are disposed closer to the abutment 83. In other words, the grippers 110 are mounted in a manner such that their maximum degree of opening with respect to the abutment 83 is less than the maximum degree of opening for the jaws 81. Thus, the spring "over-travel" of the grippers 110 is greater than that for the jaws 81, the grippers closing before and opening after the jaws as the rockers 86 are oscillated by the cams 90. The term "over-travel" as used herein describes the travel of the rockers after initial contact of the jaws or grippers with the product or tucker blade which causes resilient deflection of the leaf spring jaws or grippers away from the respective backing plate tips 82a and 112a. Since the deeper seat 111 for the gripper backing plate 112 and the thinner tip 112a for the latter lessens the maximum opening of the grippers 110, the latter close on the product first as the rocker 86 turns counterclockwise (Figs. 3 and 4), the gripper spring elements being deflected as the jaws 81 then close and have their leaf spring elements deflected to a lesser extent.

The desired sequential opening and closing of the jaws 81 and grippers 110 is obtained by fashioning the cams 90 as illustrated in Fig. 2, for example. It will be seen that the cam 90 is formed with a first high portion 90a which serves to displace the rocker 86 counterclockwise to such an extent that both the jaws 81 and the grippers 110 are firmly closed. Shortly thereafter, a slightly recessed portion 90b in the cam allows the rocker 86 to retreat under the influence of biasing spring 92 so that the jaws 81 are opened but the grippers 110 remain closed due to their greater degree of over-travel (compare Figs. 2 and 3). It is during this interval that the tucker blade 58 is withdrawn, the product being held by the grippers but released from the clamping action of the jaws. The jaws are reclosed by a third, high portion 90c of the cam 90 so that the product is firmly held until the very low portion 90d of the cam causes its release to a delivery cylinder.

Figure 8:
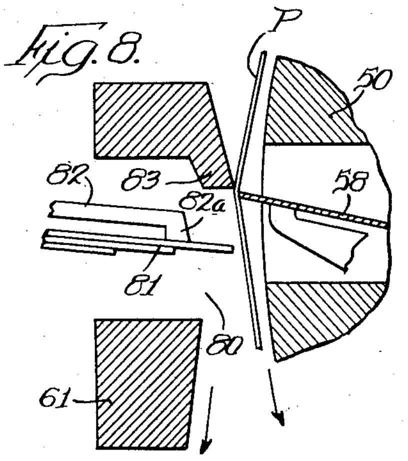
Figure 8A:
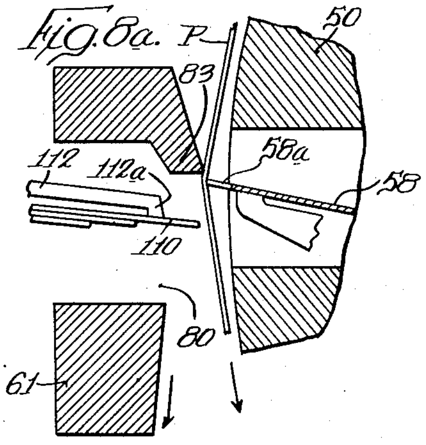

The action produced by the cams 90 is more fully illustrated by Figs. 8, 8a through 12, 12a. As shown in Figs. 8 and 8a, the jaws 81 and grippers 110 are both widely open as the notched tucker blade 58 (and product P) approaches the slot 80. This is also illustrated in the graph of Fig. 13 where in the area marked I both the jaws and grippers are open due to the angular position of the cam shaft 91 placing the relatively short radius portion 90d of the cam 90 (Fig. 2) beneath the follower 89. This condition is further illustrated by Fig. 14 in the area marked I which indicates that the jaws and grippers are open to their maximum extent, although the latter to a slightly lesser degree than that of the jaws.

Figure 9:
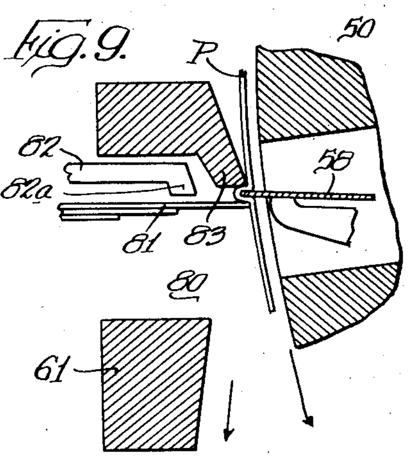
Figure 9A:
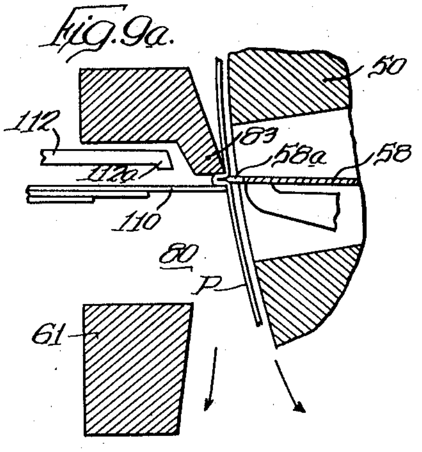

As the tucker blade enters the slot 80 and tucks the product P therein, the high portion 90a of the cam 90 pivots the rocker 86 counterclockwise (Fig. 2) until both the jaws 81 and the grippers 110 are closed. The jaws crease the product P around the blade 58, while the grippers 110 acting in the regions of the slots 58a hold the product directly against the abutment 83. This condition is illustrated in Figs. 9, 9a and is shown diagrammatically at II in the graphs of Figs. 13 and 14. It will be noted from the "blade" curve in Fig. 14 that complete closure of the jaws and grippers is obtained at the instant the tucker blade 58 reaches its maximum insertion into the jaw slot 80.

Figure 10:
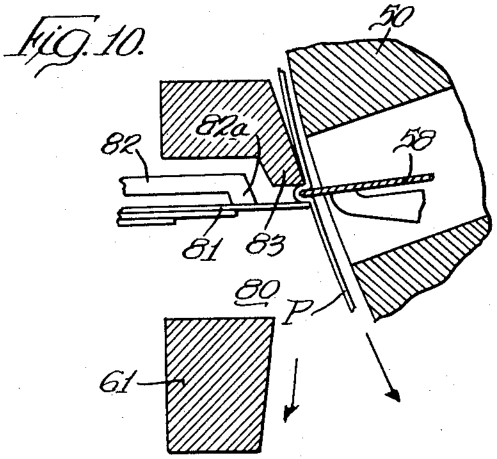
Figure 10A:
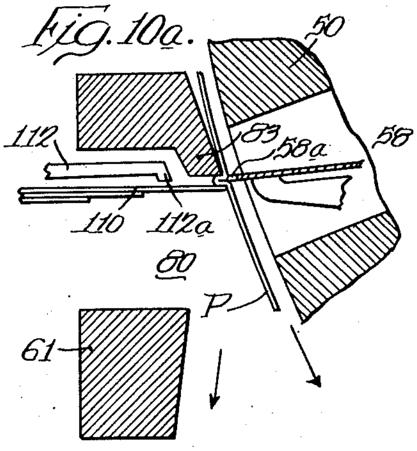

As the cylinders 61 and 50 turn further, and the cams 90 likewise rotate, the relieved portion 90b of the cam permits the rocker 86 to retreat slightly thereby causing the jaws 81 to open, but leaving the grippers 110 closed (Figs. 10, 10a) by virtue of the greater over-travel which the grippers have. This condition obtains at the instant the blade 58 begins to be withdrawn from the slot 80 as illustrated diagrammatically at III in Figs. 13 and 14. Thus, the product is firmly held in the slot 80 by the grippers 110, while the jaws 81 are opened to relieve pressure clamping the product P around the blade. The blade is withdrawn with complete freedom and has no tendency to pull all or part of the product P with it.

Figure 11:
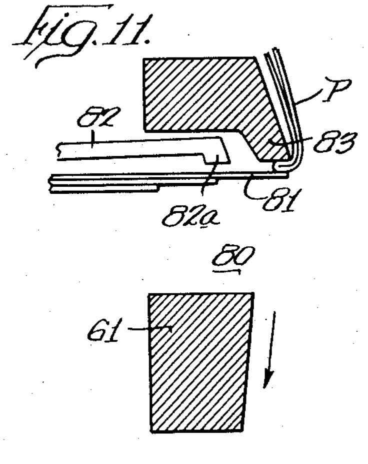
Figure 11A:
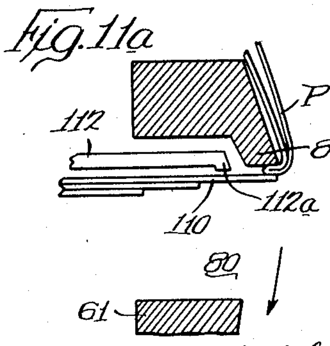
Figure 12:
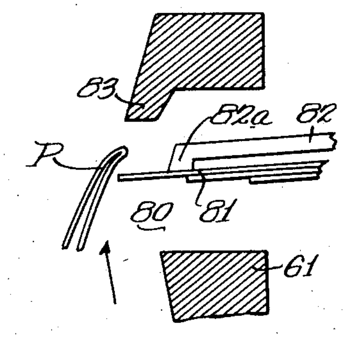
Figure 12A:
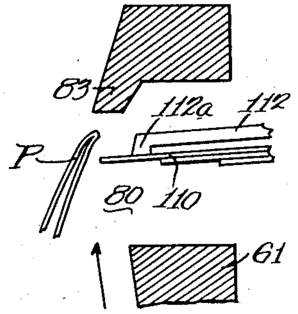

As illustrated by Figs. 11, 11a and at IV in Figs. 13 and 14, further rotation of the jaw cylinder 61 and the cam shaft 91 brings the high portion 90c of the cam against the follower 89 to reclose the jaws 81. Thus, both the jaws 81 and the grippers 110 hold the product in the jaw slot 80 as it is carried around to the delivery cylinder.

When the product is to be released to the delivery cylinder, the small radius portion 90d of the cam 90 permits the rocker 86 to retreat clockwise (Fig. 2) to such an extent that both the jaws 81 and the grippers 110 are open (Figs. 12, 12a) as illustrated in Figs. 13 and 14 at V. The cycle then repeats as the jaw slot 80 returns to the point where it meets with another tucker blade.

By way of brief summary, the sequential action of the jaws and grippers may be described as follows:

I—Blade entering jaw slot—jaws and grippers open.
II—Blade fully inserted in slot—jaws and grippers closed.
III—Blade withdrawing—jaws open, grippers closed.
IV—Blade withdrawn—jaws and grippers closed.
V—Transfer to delivery cylinder—jaws and grippers open.

It will be noted that this advantageous sequence is obtained by a very simplified mechanism in that all of the cams 90 and rockers 86 are substantially identical and susceptible of being machined or cast from a standard pattern. In the present case the sequential operation results from greater gripper over-travel achieved by making the gripper seats 111 in the rockers 86 deeper than the jaw seats 85, and by making the gripper backing plate tips 112a thinner than the jaw backing plate tips 82a. However, it will be apparent to those skilled in the art that either of these constructions alone could be sufficient to produce the greater over-travel for the grippers 110. Moreover, the same over-travel differential may be obtained by machining the seats 111 at an angle more inclined than the seats 85 toward the abutment 83. The sequential action discussed above may also be obtained by mounting the grippers 110 in standard seats on separate rockers and actuating the latter either with special cams having profiles different than the jaw cams, or by cams identical to the jaw cams but displaced slightly in phase on the cam shaft relative to the jaw cams so that the grippers open after the jaws.

Referring next to Fig. 15, a modified cam 120 is there illustrated which may be substituted for the cams 90 in Figs. 2–4 to produce the sequential action diagrammatically indicated in Figs. 16 and 17. The cam 120 is shaped generally like the cams 90 having a single relatively short, long radius portion 120a which serves to close both the jaws and grippers, an extended portion 120b of slightly lesser radius which leaves the grippers closed but permits the jaws to open, and a third portion 120c of relatively short radius which permits both the jaws and grippers to be opened.

The angular position of the rockers 86 produced by the cam 120 is illustrated in Fig. 16, the regions I, II, III, IV and V corresponding to the periods when the cam portions 120c, 120a, 120b, 120b and 120c, respectively, act on the cam follower. As illustrated more clearly in Fig. 17, the cams 120 are so phased on the cam shaft 91 that the cam portion 120a is operative at the instant the tucker blade 58 reaches its point of maximum insertion into the jaw slot 80. Thus, both the jaws and grippers are open as the blade enters the jaw slot 80, and both close at the instant that the blade reaches its point of maximum insertion, as indicated at I and II, respectively. As the blade begins to retreat from the jaw slot, the cam portion 120b bears against the follower 89 so that the jaws 81 open while the grippers 110 remain closed, as indicated at III and IV, thereby permitting the blade to be freely withdrawn. Finally, the grippers are also opened to release the product for transfer to the delivery cylinder as shown at V in Fig. 17. This sequence may be summarized as follows:

I—Blade entering jaw slot—jaws and grippers open.
II—Blade fully inserted in slot—jaws and grippers closed.
III—Blade withdrawing—jaws open, grippers closed.
IV—Blade withdrawn—jaws remain open, grippers remain closed.
V—Transfer to delivery cylinder—jaws and grippers open.

Turning now to Fig. 18, a second modified cam 130 has been shown which may also be substituted for the cams 90 in Figs. 2–4 to provide still another sequence of operation for the jaws and grippers as illustrated diagrammatically in Figs. 19 and 20. The cam 130 is profiled to have a portion 130$a$ of intermediate radius which acts on the cam followers 89 and rockers 86 at the instant that the tucker blade 58 is fully inserted into the slot 80 and until the tucker blade is withdrawn. A second profile portion 130$b$ of greater radius is provided to act on the cam followers after the tucker blade is withdrawn and until the product is released. A third profile portion 130$c$ having a relatively small radius acts on the cam followers for the remainder of the cycle permitting both the jaws and grippers to be opened. The angular position of the rockers 86 produced by the cam 130 is diagrammatically illustrated in Fig. 19 where the curve portions I, II, III, IV and V correspond to the action produced by the cam portions 130$c$, 130$a$, 130$a$, 130$b$, and 130$c$, respectively. The corresponding sequential operation of the jaws 81 and grippers 110 is indicated in Fig. 20, showing that when the tucker blade 58 has reached its point of maximum insertion, and the cam portion 130$a$ is operative, the grippers 110 are closed but the jaws 81 remain open. After the blade has been withdrawn, with complete freedom since the jaws 81 are open, the jaws then close at IV so that both the jaws and grippers hold the folded product while it is being carried around for transfer to the delivery cylinder.

This sequence of operation may thus be summarized as follows:

I—Blade entering jaw slot—jaws and grippers open.
II—Blade fully inserted in slot—jaws open, grippers closed.
III—Blade withdrawing—jaws remain open, grippers remain closed.
IV—Blade withdrawn—jaws and grippers closed.
V—Transfer to delivery cylinder—jaws and grippers open.

While the operation of the illustrated jaw folding mechanism will be apparent from the foregoing, and while it will be understood that various sequences of jaw and gripper operation may be obtained by utilizing different ones of the illustrated cams 90, 120, and 130, it is to be noted that in each of the several sequences disclosed, the jaws 81 are open and the grippers 110 are closed during the time that the tucker blade 58 is being withdrawn from the jaw slot 80. Accordingly, the product P in all cases is firmly held directly against the abutment 83 by the grippers and is totally divorced from the tucker blade by virtue of the slots 58$a$ therein. The product P is not at this time clamped around the tucker blade 58 by the jaws 81 and there is full assurance that the product will not be pulled or otherwise misalined due to friction between the blade and the folded product.

I claim:

1. A jaw folding mechanism comprising, in combination, a tucking device including a tucker blade having a plurality of notches formed therein, a jaw device having a slot formed therein and adapted to receive products tucked by entry of said blade into said slot, pluralities of closable jaw means and closable gripper means disposed in said slot and arranged so as to clamp said products tucked by entry of said blade with said gripper means located in registry with the notches in said blade, and means for causing said gripper means to be closed and said jaw means to be open when said blade is being withdrawn from said slot, whereby products tucked into said slot are not accidentally withdrawn with said blade by virtue of the absence of any clamping of the products against the blade.

2. A jaw folding mechanism comprising, in combination, a first cylinder having a notched tucker blade thereon, a jaw cylinder cooperatively spaced with respect to said first cylinder, pluralities of jaw means and gripper means spaced axially along said jaw cylinder and arranged so as to receive products tucked therein by said blade with the gripper means disposed to register with the notches in said blade, means for closing said jaw means said gripper means on products tucked therein by said blade, and means causing said gripper means to be closed and said jaw means to be open as the tucker blade is withdrawn from said jaw means.

3. A jaw folding mechanism comprising, in combination, a collecting cylinder mounting a tucker blade having a plurality of notches spaced along its outer edge, a jaw cylinder closely spaced to said collecting cylinder and having an axial slot formed therein. a backing element in said slot, pluralities of jaws and grippers disposed in said slot adjacent said backing element, means for rotating said cylinders in timed relation so that products on the collecting cylinder are tucked by entry of said blade into said slot, between said backing element and said jaws and grippers, said jaws and grippers being disposed in said slot and movable to fold and clamp tucked products against said backing element, said grippers being disposed to register with said notches in said blade, and cam means operative to actuate said jaws and grippers in a manner such that only said grippers clamp the product while the blade is being withdrawn from the slot.

4. A jaw folding mechanism comprising, in combination, a rotatable collecting cylinder having a tucker blade with an irregular outer edge, a jaw cylinder cooperatively spaced with respect to said collecting cylinder and rotatable in timed relation therewith, said jaw cylinder having a slot formed therein to receive said tucker blade, pluralities of spring jaws and grippers spaced in said slot, means cooperating with said spring jaws and grippers to clamp products tucked by said blade, said grippers being located relative to the irregularities in said blade so as to avoid clamping engagement with the latter, means mounting said jaws to provide a wider maximum opening and less spring over-travel than said grippers, and cam means for moving said jaws and grippers in unison and in timed relation to the entry and withdrawal of said blade into said slot such that the jaws are open when the blade is being withdrawn, said grippers remaining closed to hold a product as the blade is withdrawn by virtue of their greater spring over-travel.

5. A jaw folding mechanism comprising, in combination, a first cylinder mounting a tucker blade having a plurality of spaced notches formed therein, a jaw cylinder having an axial slot formed therein, means mounting said cylinders for rotation in timed relation so that said blade is successively inserted into said slot, pluralities of jaws and grippers mounted in said slot, means in said slot cooperating with said jaws and said grippers to clamp products tucked by said blade, said grippers being in registry with the notches in said blade, means for cyclically opening said jaws and said grippers as said blade is entering said slot to tuck a product into the latter, means for cyclically closing said jaws and said grippers as said blade reaches its maximum insertion into said slot, means for cyclically opening said jaws and maintaining said grippers closed as said blade is withdrawn from said slot, means for cyclically reclosing said jaws, and means for cyclically opening said jaws and said grippers to release the folded product.

6. The combination set forth in claim 5 further characterized in that said four last named means comprise peripheral cams operative on said jaws and grippers together with means for rotating said cams in timed relation to said jaw cylinder.

7. The combination set forth in claim 6 further characterized in that said cams are all identical and rotated in unison, and in which said jaws and grippers are spring fingers, the grippers being mounted to have greater wipe than the jaws.

8. The combination set forth in claim 7 further characterized in that said spring jaws and grippers are mounted on identical cam actuated rockers, the seats for the grippers being slightly deeper than the seats for the jaws to provide the greater wipe for the grippers.

9. A jaw folding mechanism comprising, in combination, a first cylinder mounting a tucker blade having a plurality of spaced notches formed therein, a jaw cylinder carried adjacent said first cylinder and having an axial slot formed therein, a backing element in said slot arranged axially of said jaw cylinder, pluralities of jaws and grippers mounted in said slot adjacent said backing element, means mounting said cylinders for rotation in timed relation so that said blade is successively inserted into said slot, between said jaws and grippers, said jaws and grippers mounted in said slot cooperating with said backing element so as to close and clamp products tucked by said blade, said grippers being in registry with the notches in said blade, means for cyclically opening said jaws and grippers as said blade is entering said slot to tuck a product into the latter, means for closing said jaws and grippers as said blade reaches its maximum insertion into said slot, means for opening said jaws and maintaining said grippers closed as said blade is withdrawn from said slot, and means for subsequently opening said grippers to release the folded product.

10. The combination set forth in claim 9 further characterized in that said four last named means comprise peripheral cams operative on said jaws and grippers together with means for rotating said cams in timed relation to said jaw cylinder.

11. The combination set forth in claim 10 further characterized in that said cams are all identical and rotated in unison, and in which said jaws and grippers are spring fingers, the grippers being mounted to have greater wipe than the jaws.

12. The combination set forth in claim 11 further characterized in that said spring jaws and grippers are mounted on identical cam actuated rockers, the seats for the grippers being slightly deeper than the seats for the jaws to provide the greater wipe for the grippers.

13. A jaw folding mechanism comprising, in combination, a first cylinder mounting a tucker blade having a plurality of spaced notches formed therein, a jaw cylinder having an axial slot formed therein, means mounting said cylinders for rotation in timed relation so that said blade is successively inserted into said slot, pluralities of jaws and grippers mounted in said slot, means in said slot cooperating with said jaws and said grippers to clamp products tucked by said blade, said grippers being in registry with the notches in said blade, means for cyclically opening said jaws and grippers as said blade is entering said slot to tuck a product into the latter, means for closing said grippers and holding said jaws open as said blade reaches its maximum insertion into said slot, means for subsequently closing said jaws after said blade is withdrawn from said slot, and means for subsequently opening both said jaws and grippers to release the folded product.

14. The combination set forth in claim 13 further characterized in that said four last named means comprise peripheral cams operative on said jaws and grippers together with means for rotating said cams in timed relation to said jaw cylinder.

15. The combination set forth in claim 14 further characterized in that said cams are all identical and rotated in unison, and in which said jaws and grippers are spring fingers, the grippers being mounted to have greater wipe than the jaws.

16. The combination set forth in claim 15 further characterized in that said spring jaws and grippers are mounted on identical cam actuated rockers, the seats for the grippers being slightly deeper than the seats for the jaws to provide the greater wipe for the grippers.

17. In a jaw folding mechanism, a holding cylinder having a slot formed therein, a notched blade and means for carrying the same to enter said slot, pluralities of spring jaws and grippers pivotally mounted in said slot, with said grippers located in registry with the notches in said blade, means cooperating with said spring jaws and grippers to clamp products tucked by entry of said blade into said slot, and means for opening and closing said jaws and grippers with the latter having a greater spring wipe after closing than the former, so that the grippers are closed while the jaws are open throughout the portion of the folding operation while the blade is withdrawn from the slot.

18. In a jaw folding mechanism, a rotatable holding cylinder having a slot therein, a notched blade and means for carrying the same to enter said slot, pluralities of spring jaws and grippers disposed in said slot with said grippers located in registry with the notches in said blade, means pivotally mounting said jaws and grippers in said slot to rock into closing relation with one edge of the latter, said mounting means providing a wider maximum opening for said jaws than for said grippers, and cam means rotatable in timed relation with said cylinder for rocking said mounting means in unison with said grippers having greater wipe than said jaws so that said grippers are closed before and opened after said jaws during the folding operation.

References Cited in the file of this patent

UNITED STATES PATENTS

1,149,684 Pringle ---------------- Aug. 10, 1915